United States Patent
Tani

(10) Patent No.: US 7,639,803 B2
(45) Date of Patent: Dec. 29, 2009

(54) OPTICAL DISK PLAYER

(75) Inventor: Hironori Tani, Osaka (JP)

(73) Assignee: Funai Electric Co., Ltd., Osaka (JP)

( * ) Notice: Subject to any disclaimer, the term of this patent is extended or adjusted under 35 U.S.C. 154(b) by 999 days.

(21) Appl. No.: 11/113,064

(22) Filed: Apr. 25, 2005

(65) Prior Publication Data
US 2005/0254657 A1 Nov. 17, 2005

(30) Foreign Application Priority Data
Apr. 28, 2004 (JP) .......................... P2004-132728

(51) Int. Cl.
*H04L 9/00* (2006.01)
(52) U.S. Cl. ........................ 380/44; 713/150
(58) Field of Classification Search ................ 709/219; 345/156, 781; 713/793; 380/44
See application file for complete search history.

(56) References Cited

U.S. PATENT DOCUMENTS

| | | | | |
|---|---|---|---|---|
| 6,097,814 | A * | 8/2000 | Mochizuki | 380/44 |
| 7,020,780 | B1 * | 3/2006 | Mochizuki | 713/193 |
| 7,190,345 | B2 * | 3/2007 | Nashida et al. | 345/156 |
| 2004/0130576 | A1 * | 7/2004 | Fujita et al. | 345/781 |
| 2005/0097191 | A1 * | 5/2005 | Yamaki et al. | 709/219 |
| 2005/0240660 | A1 * | 10/2005 | Sakao et al. | 709/219 |

FOREIGN PATENT DOCUMENTS

| | | |
|---|---|---|
| JP | 11-41563 | 2/1999 |
| JP | A-11-238367 | 8/1999 |
| JP | A-2002-050106 | 2/2002 |
| JP | A-2002-278687 | 9/2002 |
| JP | 2002-313029 | 10/2002 |
| JP | 2003-297064 | 10/2003 |
| JP | 2004-56529 | 2/2004 |

OTHER PUBLICATIONS

Jun Rekimoto ; Tilting operations for small screen interfaces; Year of Publication: 1996; AMC; pp. 167-168.*

* cited by examiner

*Primary Examiner*—Michael J Simitoski
*Assistant Examiner*—Monjour Rahim
(74) *Attorney, Agent, or Firm*—Morgan, Lewis & Bockius LLP

(57) ABSTRACT

An optical disk player to reproduce information recorded on an optical disk, being operable by a remote controller, includes a system controller. The system controller displays an image of the remote controller on a display device by set-up. The system controller stores different items of color information for discriminating, from one another, inhibit key information indicating a key by which key entry is inhibited during playing, the key being other than keys for which inhibition setting of a key operation is previously disabled on a side of the player or the optical disk, user-designated inhibit key information indicating a user-designated key for which inhibition of the key entry is desired during playing of the optical disk, and inhibition-setting disabled key information. The system controller displays color marks according to the different items of color information at segments of corresponding keys on the remote controller image displayed on the display device.

4 Claims, 4 Drawing Sheets

FIG. 3

COLOR INFORMATION TABLE          224a

| ENTER KEY<br>SKIP KEY | INHIBIT KEY<br>INFORMATION | RED INFORMATION |
|---|---|---|
| SKIP KEY<br>TEMPORARY STOP KEY | USER-DESIGNATED<br>INHIBIT KEY<br>INFORMATION | BLUE INFORMATION |
| POWER KEY, OPEN/CLOSE KEY, PLAY KEY, STOP KEY, SET-UP KEY | INHIBITION-SETTING<br>DISABLED KEY<br>INFORMATION | GREEN INFORMATION |

OPTICAL DISK PLAYER

BACKGROUND OF THE INVENTION

1. Field of the Invention

This invention is an optical disk player operable by a remote controller for reproducing information recorded on an optical disk.

2. Description of the Related Art

In recent years, an optical disk player for playing an optical disk such as a DVD (digital versatile disk) with information such as an image and voice being recorded thereon has become widespread. The operation for such an optical disk player is done using a key operation unit attached to the front panel of a player body or a remote controller. However, in the present circumstances, almost all users perform this operation using the remote controller.

The remote controller includes various kinds of keys such as a power key for turning on/off the power of the player, an open/close key for opening/closing a disk tray, a play key for executing a playing operation for a loaded optical disk, a stop key for stopping the playing operation or a skip operation, a temporary stop key for temporarily stopping the playing operation, a set-up key for executing setup, a screen display key for displaying information on a screen, a menu key for displaying a menu, a skip key for executing skip-up (quick forwarding) and skip-down (quick reversing), an enter key for determining inputted operation information, a cancel key for canceling the inputted operation information, and ten keys for inputting numerals.

Meanwhile, in a general home, in most cases, the remote controller is not located seriously. So, during playing, a user unconsciously touches a key of the remote controller so that the key unexpected by the user may be operated. Thus, as the case may be, the optical disk reproducing apparatus falls in an operating status not intended by the user. This is attributable to the fact that the key entry other than those inhibited by the apparatus itself or the disk itself is received. In other words, the key entry may be done by the unconscious operation by the user or other persons or the key may be hit by an object so that the unexpected operation of the optical disk player may be performed. However, in such a conventional optical disk apparatus described above, the user cannot designate the key he wants to inhibit during playing so that the key entry other than those inhibited by the apparatus itself or disk itself will be received, thus leading to an unexpected operation which is a problem to be solved.

In the related art disclosed in JP-A-11-238367, among various operation keys, the key(s) operable at present can be notified the user. However, since the user cannot designate the key he wants to inhibit during playing, the above problem cannot be solved.

In the related art disclosed in JP-A-2002-278687, inconveniences in function selection by a cyclic key in various apparatuses or a stop key of the remote controller are removed. However, in this related art also, the user cannot designate the key he wants to inhibit during playing so that this related art cannot solve the above problem.

In the related art disclosed in JP-A-2002-50106, lock releasing of an operation key for giving commands of various operations can be done manually as the occasion demands. In addition, in the case of setting for synchronous recording, by automatically releasing the setting in correlation with a prescribed operation, key lock setting with satisfactory operability can be made. However, in this related art also, the user cannot designate the key he wants to inhibit during playing so that this related art cannot solve the above problem.

SUMMARY OF THE INVENTION

This invention has been accomplished in order to solve the above problem. The present invention provides an optical disk player which permits a user to designate other keys than necessary and minimum keys during playing of an optical disk, thereby inhibiting the corresponding key entry.

According to aspect 1 of the invention, an optical disk player for reproducing information recorded on an optical disk, being operable by a remote controller, has a system controller which includes a remote controller image displaying means for displaying an image of the remote controller on the display device by set-up, an inhibit key information storing means for storing inhibit key information indicating a key by which key entry is inhibited during playing, the key being other than keys for which inhibition setting of a key operation is previously disabled on the side of the player or the optical disk, a user-designated inhibit key information storing means for storing user-designated inhibit key information indicating a user-designated key for which inhibition of the key entry is desired during playing of the optical disk, a color information storing means for storing different items of color information for discriminating the inhibit key information, the user-designated inhibit key information, and the inhibition-setting disabled key information from one another, an inhibition determining means for determining whether or not the key entry is inhibited when it is received on the basis of the presence/absence of the inhibit key information from the inhibit key information storing means and/or the user-designated inhibit key information from the user-designated inhibit key information storing means, an inhibition side determining means for determining, if it is determined by the inhibition determining means that the key entry is inhibited, on which side of the player or optical disk or of the user the key entry is inhibited on the basis of the inhibit key information and user-designated inhibit key information, and a color mark displaying means that reads, if the determination result by the inhibition side determining means is the player or optical disk side, the color information corresponding to the inhibit key information from the color information storing means thereby to display a general inhibit mark with the color represented by the color information at the segment of the corresponding key of the remote controller image displayed on the display device, that reads, if the determination result by the inhibition side determining means is the user side, the color information corresponding to the user-designated inhibit key information from the color information storing means thereby to display a user-designated inhibit mark with the color represented by the color information on the display device, and that displays, if the inhibit key on the side of the player or optical disk is the same as that on the side of the user, the general inhibit mark at the segment of the corresponding key of the remote controller image displayed on the display device and reads the color information corresponding to the inhibition-setting disabled key information from the color information storing means thereby to display an inhibition-setting disabled mark of the color information at the segment of the corresponding key of the remote controller image displayed on the display device.

In this configuration, by set-up, the image of the remote controller is displayed on the display device by the remote controller image displaying means. The inhibit key information indicating a key(s) by which key entry is inhibited during playing, this key being other than key(s) for which inhibition setting of a key operation is previously disabled on the side of the player or the optical disk, is stored in the inhibit key information storing means. During playing of the optical disk, the key(s) for which inhibition of the key entry is desired is selectively designated by the user. The user-designated inhibit key information indicating the designated key is stored in the user-designated inhibit key information storing means. The different items of color information for discriminating the inhibit key information, user-designated inhibit key information and inhibition-setting disabled key information from one another are stored in the color information storing means.

When the key entry is received, whether or not the key entry is inhibited by the inhibition determining means is determined on the basis of the presence/absence of the inhibit key information from the inhibit key information storing means and/or the user-designated inhibit key information from the user-designated inhibit key information storing means. If it is determined by the presence of the inhibit key information and/or user-designated inhibit key information that the key entry is inhibited, on which side of the player or optical disk and the user the key entry is inhibited is determined by the inhibition side determining means on the basis of the inhibit key information and user-designated inhibit key information.

Thereafter, the color mark displaying means performs the following processing. If the determination result by the inhibition side determining means is the player or optical disk side, the color mark display means reads the color information corresponding to the inhibit key information from the color information storing means thereby to display a general inhibit mark with the color represented by the color information at the segment of the corresponding key of the remote controller image displayed on the display device. If the determination result by the inhibition side determining means is the user side, the color mark display means reads the color information corresponding to the user-designated inhibit key information from the color information storing means thereby to display a user-designated inhibit mark with the color represented by the color information on the display device. Further, if the inhibit key(s) on the side of the player or optical disk is the same as that on the side of the user, the color mark display means displays the general inhibit mark at the segment of the corresponding key of the remote controller image displayed on the display device.

In accordance with this configuration, the marks with the colors corresponding to the inhibit key information, user-designated inhibit key information and inhibition-setting disabled key information can be displayed at the segments of the corresponding keys of the remote controller image displayed on the display device. In addition, the key(s) other than necessary and minimum keys during playing of an optical disk can be designated by the user so that the corresponding key entry is inhibited. Thus, inadvertent key entry during playing of the optical disk can be prevented. Accordingly, it is possible to prevent the reproduced image from being fed forward against the user's will or the image not relevant to the image now being reproduced from being displayed. Further, as described above, by displaying the keys in classified different colors, the key(s) for which inhibition of the key entry is desired by the user and the key(s) for which inhibition setting of the key entry is disabled can be discriminated immediately, thus facilitating the setting operation of the inhibit key(s).

According to aspect 2 of the invention, an optical disk player for reproducing information recorded on an optical disk, being operable by a remote controller, has a system controller that displays an image of the remote controller on a display device by set-up, that stores different items of color information for discriminating, from one another, inhibit key information indicating a key by which key entry is inhibited during playing, this key being other than keys for which inhibition setting of a key operation is previously disabled on the side of the player or the optical disk, user-designated inhibit key information indicating a user-designated key for which inhibition of the key entry is desired during playing of the optical disk and inhibition-setting disabled key information, and that displays color marks according to the different items of color information at the segments of the corresponding keys on the remote controller image displayed on the display device.

In this configuration, an image of the remote controller is displayed on a display device by set-up. Different items of color information are stored for discriminating, from one another, inhibit key information indicating a key by which key entry is inhibited during playing, this key being other than keys for which inhibition setting of a key operation is previously disabled on the side of the player or the optical disk, user-designated inhibit key information indicating a user-designated key for which inhibition of the key entry is desired during playing of the optical disk and key information with the inhibition-setting disabled. Color marks according to the different items of color information are displayed at the segments of the corresponding keys on the remote controller image displayed on the display device.

In accordance with this configuration, the key(s) other than necessary and minimum keys during playing of an optical disk can be designated by the user so that the corresponding key entry is inhibited. Thus, inadvertent key entry during playing of the optical disk can be prevented. Accordingly, it is possible to prevent the reproduced image from being fed forward against the user's will or the image not relevant to the image now being reproduced from being displayed.

The invention of aspect 3 is the optical disk player characterized in that in the optical disk player of aspect 2, the system controller includes a remote controller image displaying means for displaying an image of the remote controller on the display device by set-up, an inhibit key information storing means for storing inhibit key information indicating a key by which the key entry is inhibited during playing, the key being other than keys for which inhibition setting of a key operation is previously disabled on the side of the player or the optical disk, a user-designated inhibit key information storing means for storing user-designated inhibit key information indicating a user-designated key for which inhibition of the key entry is desired during playing of the optical disk, and a color information storing means for storing different items of color information for discriminating the inhibit key information, user-designated inhibit key information and inhibition-setting disabled key information from one another. Therefore, the inhibit key information, user-designated inhibit key information and inhibition-setting disabled key information can be displayed in different colors, respectively. The user can know at a glance in what status the keys on the remote controller are placed during playing.

The invention of aspect 4 is the optical disk player characterized in that in the optical disk player of aspect 2, the system controller includes an inhibition determining means for determining whether or not the key entry is inhibited when it is received on the basis of the presence/absence of the inhibit key information from the inhibit key information storing means and/or the user-designated inhibit key information from the user-designated inhibit key information storing means, an inhibition side determining means for determining, if it is determined by the inhibition determining means that the key entry is inhibited, on which side of the player or optical disk and the user the key entry is inhibited on the basis of the inhibit key information and user-designated inhibit key information, and a color mark displaying means for reading, if the determination result by the inhibition side determining means is the player or optical disk side, the color information corresponding to the inhibit key information from the color information storing means thereby to display a general inhibit mark with the color represented by the color information at the segment of the corresponding key of the remote controller image displayed on the display device, for reading, if the determination result by the inhibition side determining means is the user side, the color information corresponding to the user-designated inhibit key information from the color information storing means thereby to display a user-designated inhibit mark with the color represented by the color information on the display device, and displaying, if the inhibit key on the side of the player or optical disk is the same as that on the side of the user, the general inhibit mark at the segment of the corresponding key of the remote controller image displayed on the display device and reading the color information corresponding to the inhibition setting disabled key information from the color information storing means thereby to display an inhibition setting disabled mark of the color information at the segment of the corresponding key of the remote controller image displayed on the display device. Therefore, the marks with the colors corresponding to the inhibit key information, user-designated inhibit key information and inhibition-setting disabled key information can be displayed at the segments of the corresponding keys of the remote controller image displayed on the display device.

In accordance with this invention, the system controller is provided including a remote controller image displaying means for displaying an image of the remote controller on the display device by set-up, an inhibit key information storing means for storing inhibit key information indicating a key by which key entry is inhibited during playing, this key being other than keys for which inhibition setting of a key operation is previously disabled on the side of the player or the optical disk, a user-designated inhibit key information storing means for storing user-designated inhibit key information indicating a user-designated key for which inhibition of the key entry is desired during playing of the optical disk, a color information storing means for storing different items of color information for discriminating the inhibit key information, user-designated inhibit key information and inhibition-setting disabled key information from one another, an inhibition determining means for determining whether or not the key entry is inhibited when it is received on the basis of the presence/absence of the inhibit key information from the inhibit key information storing means and/or the user-designated inhibit key information from the user-designated inhibit key information storing means, an inhibition side determining means for determining, if it is determined by the inhibition determining means that the key entry is inhibited, on which side of the player or optical disk and the user the key entry is inhibited on the basis of the inhibit key information and user-designated inhibit key information, and a color mark displaying means for reading, if the determination result by the inhibition side determining means is the player or optical disk side, the color information corresponding to the inhibit key information from the color information storing means thereby to display a general inhibit mark with the color represented by the color information at the segment of the corresponding key of the remote controller image displayed on the display device, for reading, if the determination result by the inhibition side determining means is the user side, the color information corresponding to the user-designated inhibit key information from the color information storing means thereby to display a user-designated inhibit mark with the color represented by the color information on the display device, and displaying, if the inhibit key on the side of the player or optical disk is the same as that on the side of the user, the general inhibit mark at the segment of the corresponding key of the remote controller image displayed on the display device and reading the color information corresponding to the inhibition setting disabled key information from the color information storing means thereby to display an inhibition setting disabled mark of the color information at the segment of the corresponding key of the remote controller image displayed on the display device. Therefore, the marks with the colors corresponding to the inhibit key information, user-designated inhibit key information and inhibition-setting disabled key information can be displayed at the segments of the corresponding keys of the remote controller image displayed on the display device. In addition, the key(s) other than necessary and minimum keys during playing of an optical disk can be designated by the user so that the corresponding key entry is inhibited. Thus, inadvertent key entry during playing of the optical disk can be prevented. Accordingly, it is possible to prevent the reproduced image from being fed forward against the user's will or the image not relevant to the image now being reproduced from being displayed. Further, as described above, by displaying the keys in classified different colors, the key(s) for which inhibition of the key entry is desired by the user and the key(s) for which inhibition-setting of the key entry is disabled can be discriminated immediately, thus facilitating the setting operation of the inhibit key(s) Further, in accordance with this invention, the system controller is provided for making control of displaying an image of the remote controller on a display device by set-up, storing different items of color information for discriminating, from one another, inhibit key information indicating a key by which key entry is inhibited during playing, this key being other than keys for which inhibition setting of a key operation is previously disabled on the side of the player or the optical disk, user-designated inhibit key information indicating a user-designated key for which inhibition of the key entry is desired during playing of the optical disk and key information with the inhibition-setting disabled, and displaying color marks according to the different items of color information at the segments of the corresponding keys on the remote controller image displayed on the display device. Therefore, the marks with the colors corresponding to the inhibit key information, user-designated inhibit key information and inhibition-setting disabled key information can be displayed at the segments of the corresponding keys of the remote controller image displayed on the display device. In addition, the key(s) other than necessary and minimum keys during playing of an optical disk can be designated by the user so that the corresponding key entry is inhibited. Thus, inadvertent key entry during playing of the optical disk can be prevented. Accordingly, it is possible to prevent the reproduced image from being fed forward against the user's will or the image not relevant to the image now being reproduced from being displayed.

BRIEF DESCRIPTION OF THE DRAWINGS

FIG. 3 is a view showing an example of the contents of a color information table stored in a color information storing means of a system controller in this embodiment.

DETAILED DESCRIPTION OF THE INVENTION

Figure 1:
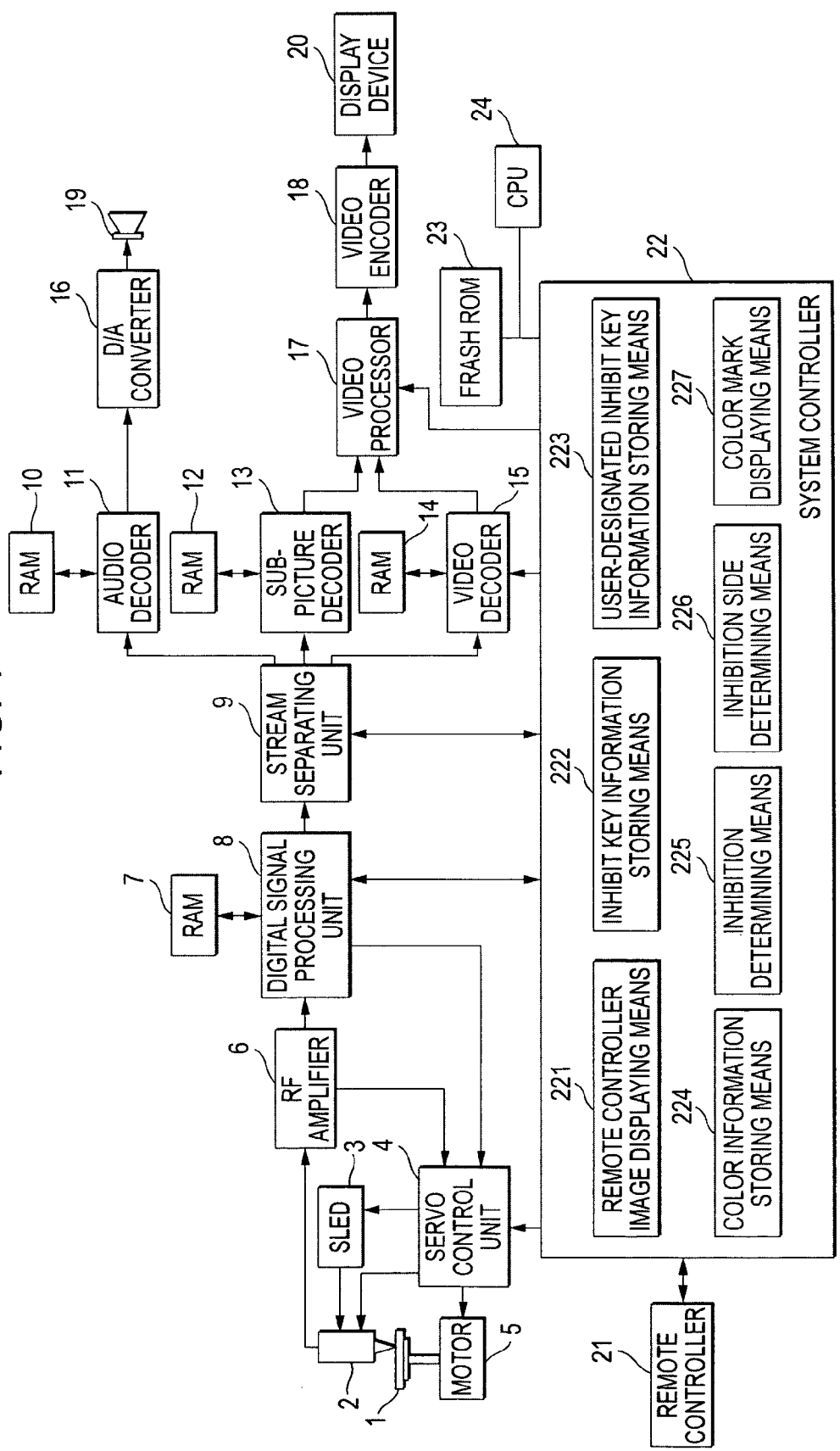
FIG. 1 is a block diagram showing the configuration of the optical disk reproducing apparatus according to an embodiment of this invention.

Now referring to the drawings, an explanation will be given of an embodiment of this invention. FIG. 1 is a block diagram showing the configuration of the optical disk reproducing apparatus according to an embodiment of this invention. The optical disk player includes a spindle motor 5 for rotating an optical disk 1, an optical pick-up 2 for emitting a laser beam for reproducing information recorded on the optical disk 1 and for receiving the beam reflected from the optical disk 1, a sled 3 for moving the optical pick-up 2 in a radial direction of the optical disk 1, and a servo control unit 4 for driving a spindle motor 5 and the sled 3 according to an instruction from the system controller 22 and moving an objective lens (not shown) incorporated in the optical pick-up 2, thereby making the control of moving the focusing position of the laser beam vertically and horizontally for a recording face of the optical disk 1.

The optical disk player further includes an RF amplifier 6 for amplifying an RF signal which is a signal read from the optical pick-up during playing of the optical disk 1, a digital signal processing unit 8, after having converted the RF signal outputted from the RF amplifier 6 into a digital data, for performing signal demodulation processing and error correction processing corresponding to the data format of the optical disk 1 and storing the data thus created in a RAM 7, and a stream separating unit 9 for separating audio data, sub-picture data and video data from one another from the data stream outputted from the digital signal processing unit 8 according to an instruction from the system controller 22.

The optical disk player further includes an audio decoder 11 for subjecting predetermined decoding processing to the audio data supplied from the stream separating unit 9, a RAM 10 for temporarily storing the data to be subjected to the decoding processing by the audio decoder 11, a sub-picture decoder 13 for subjecting predetermined processing to the sub-picture data supplied from the stream separating unit 9, a RAM 12 for temporarily storing the data to be subjected to the decoding processing by the sub-picture decoder 13, a video decoder 15 for subjecting predetermined decoding processing to the video data supplied from the stream separating unit 9, and a RAM 14 for temporarily storing the data to be subjected to the decoding processing by the video decoder 1S.

The optical disk player further includes a video processor 17 for synthesizing the data outputted from the video decoder 15 and the data supplied from the sub-picture decoder 13 according to an instruction from the system controller 22, a video encoder 18 for converting the synthesized data outputted from the video processor 17 into a video signal for display so that an image is displayed on a display device 20, and a D/A converter 16 for converting the data outputted from the audio decoder 11 into an analog audio signal to be supplied to e.g. a speaker 19.

The optical disk player further includes a remote controller (remote controller) 21 provided with a playing key for giving a playing command to the system controller 22 and various operating keys such as a stopping key for giving a play-stopping command, and the above system controller 22 for controlling the entire player.

The optical disk player further includes a flash ROM 23 in which programs and data used for controlling respective components of the player and the entire player, and a CPU 24 for performing operation processing according to the programs and data of the flash ROM 23 to control the system controller 22.

The system controller 22 includes, as components by which this embodiment is characterized, a remote controller image displaying means 221 for displaying the image of the remote controller 21 on the display unit 20 by set-up, an inhibit key information storing means 222 for storing inhibit key information indicating a key(s) by which key entry is inhibited during playing, this key being other than key(s) for which inhibition setting of a key operation is previously disabled on the side of the player or the optical disk, a user-designated inhibit key information storing means 223 for storing user-designated inhibit key information indicating a user-designated key(s) for which inhibition of the key entry is desired during playing of the optical disk, and a color information storing means 224 for storing different items of color information for discriminating the above inhibit key information, user-designated inhibit key information and inhibition-setting disabled key information from one another.

The system controller 22 further includes an inhibition determining means 225 for determining whether or not the key entry is inhibited when it is received on the basis of the presence/absence of the inhibit key information from the inhibit key information storing means 222 and/or the user-designated inhibit key information from the user-designated inhibit key information storing means 223, and an inhibition side determining means 226 for determining, if it is determined by the inhibition determining means 225 that the key entry is inhibited, on which side of the player or optical disk and the user the key entry is inhibited on the basis of the above inhibit key information and user-designated inhibit key information. Incidentally, the key information inhibited on the side of the optical disk side is included in the control information within a lead-in area of the optical disk.

The system controller 22 further includes a color mark displaying means 227. If the determination result by the inhibition side determining means is the player or optical disk side, the color mark display means 227 reads the color information corresponding to the inhibit key information from the color information storing means 224 thereby to display a general inhibit mark with the color represented by the color information at the segment of the corresponding key of the remote controller image displayed on the display device. If the determination result by the inhibition side determining means is the user side, the color mark display means 227 reads the color information corresponding to the user-designated inhibit key information from the color information storing means 224 thereby to display a user-designated inhibit mark with the color represented by the color information on the display device 20. Further, if the inhibit key(s) on the side of the player or optical disk is the same as that on the side of the User, the color mark display means 227 displays the general inhibit mark at the segment of the corresponding key of the remote controller image displayed on the display device, and reads the color information corresponding to the inhibition setting disabled key information from the color information storing means 224 thereby to display an inhibition setting disabled mark with the color represented by the color information at the segment of the corresponding key of the remote controller image displayed on the display device 20.

Figure 2:
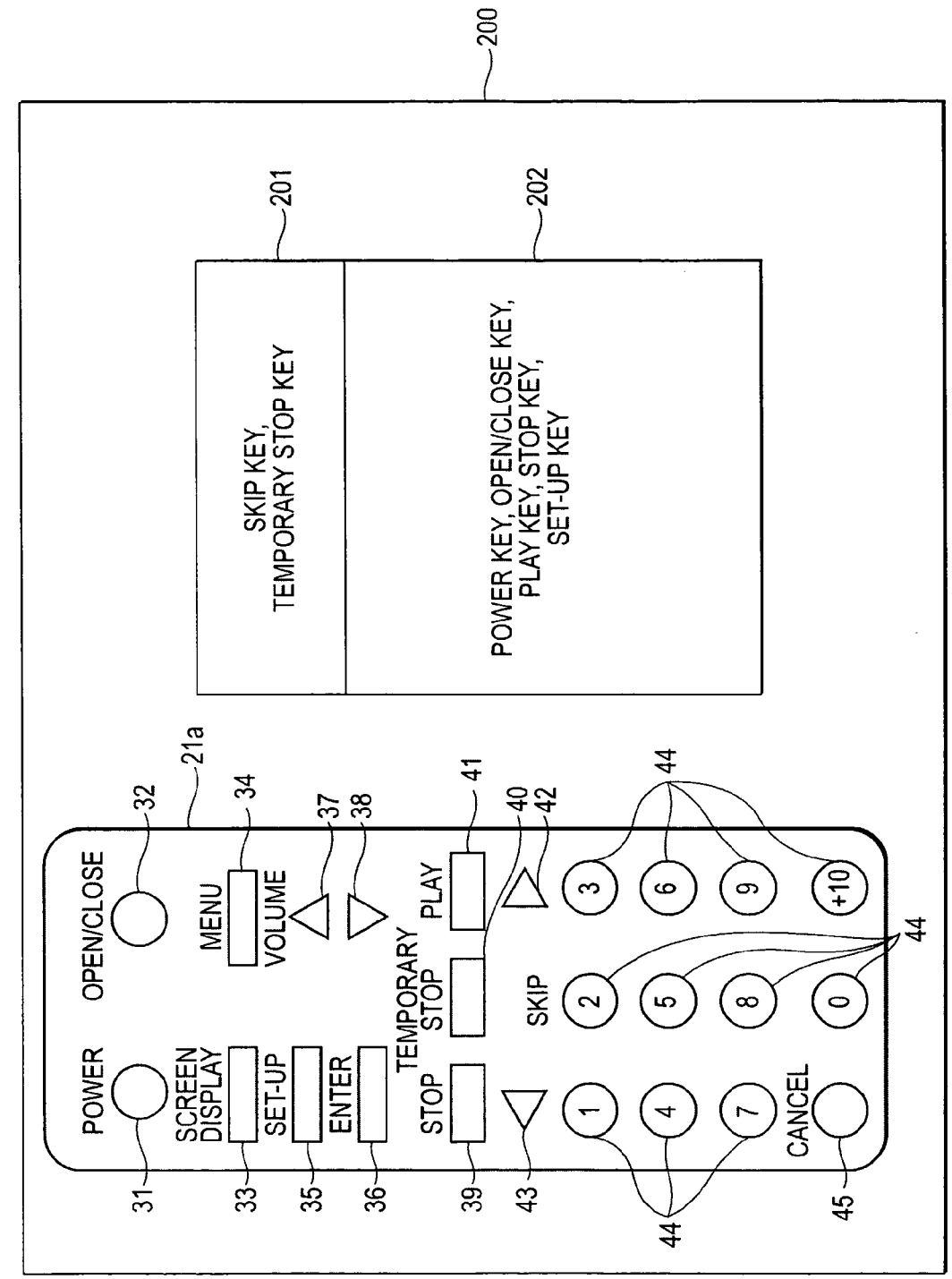
FIG. 2 is a view showing an example of a display screen on a display device on which a remote controller image and others are displayed in this embodiment.

FIG. 2 is a view showing an example of a display screen 200 on the display device 20 on which a remote controller image 21a and others are displayed according to this embodiment.

In FIG. 2, the remote controller image 21a indicates an operating face of the remote controller 21. The remote controller image 211a displayed on this operating face includes a power key 31, an open/close key 32 for opening/closing a disk tray, a screen display key 33 for making screen display, a menu key 34 for making menu display, a set-up key 35 for executing set-up, an enter key 36 for determining operated contents, volume keys 37, 38 for volume adjustment, a stop key 39 for stopping e.g. a playing operation, a temporary-stopping key 40 for temporarily stopping e.g. the playing operation, a play key 41 for starting the playing, skip keys 42, 43 for executing skip-up (quick forwarding) and skip-down (quick reversing), ten keys 44 for inputting numerals, respectively, and a cancel key 45 for canceling the inputted operation information. Incidentally, the kinds of the keys and key arrangement on the remote controller 21 should not be limited to those shown in FIG. 2.

Further, in a region 201 of the display screen 200, a key name(s) being selected during playing, e.g. "skip key" and "temporary stop key" are displayed. In a region 202 of the display screen 200, key names for which inhibition setting is disabled, e.g. "power key", "open/close key", "play key", "stop key" and "set-up key" are displayed.

FIG. 3 is a view showing an example of the contents of a color information table 224a stored in the color information storing means 224 of the system controller 22 in this embodiment.

In FIG. 3, the color information table 224a contains the inhibit key information indicating a key(s) by which key entry is inhibited during playing, this key being other than key(s) for which inhibition setting of a key operation is previously disabled on the side of the player or the optical disk, the user-designated inhibit key information indicating a user-designated key(s) for which inhibition of the key entry is desired during playing of the optical disk, key information inhibition-disabled on the side of the player, red information corresponding to the inhibit key information, blue information corresponding to the user-designated inhibit key information, and green information corresponding to the inhibition-setting disabled key information. Incidentally, the color should not be limited to red, blue and green. In this case, the enter key and skip key are set as the inhibit key information, the skip key and temporary stop key are set as the user-designated inhibit key information, and the power key, open/close key, play key, stop key and set-up key are set as the inhibition-setting disabled key information.

Therefore, in the remote controller image 21a shown in FIG. 2, in the case where the segment of a selected key is to be colored, the key is selected using a cursor so that the segment of the selected key is highlight-displayed. At this time, if the enter key on the remote controller 21 is depressed, the segment of the selected key is colored by the corresponding color.

Through such coloring, the segments of the enter key 36 and skip keys 42, 43 are displayed in blue, the segment of the temporary stop key 40 is displayed in blue, and the segments of the power key 31, open/close key 32, play key 41, stop key 39 and set-up key 35 are displayed in green. Incidentally, as regards the skip key contained in the user-designated inhibit key information, since the skip key contained in the inhibit key information is given priority, the segments of the skip keys 42, 43 will be displayed in red.

Figure 4:
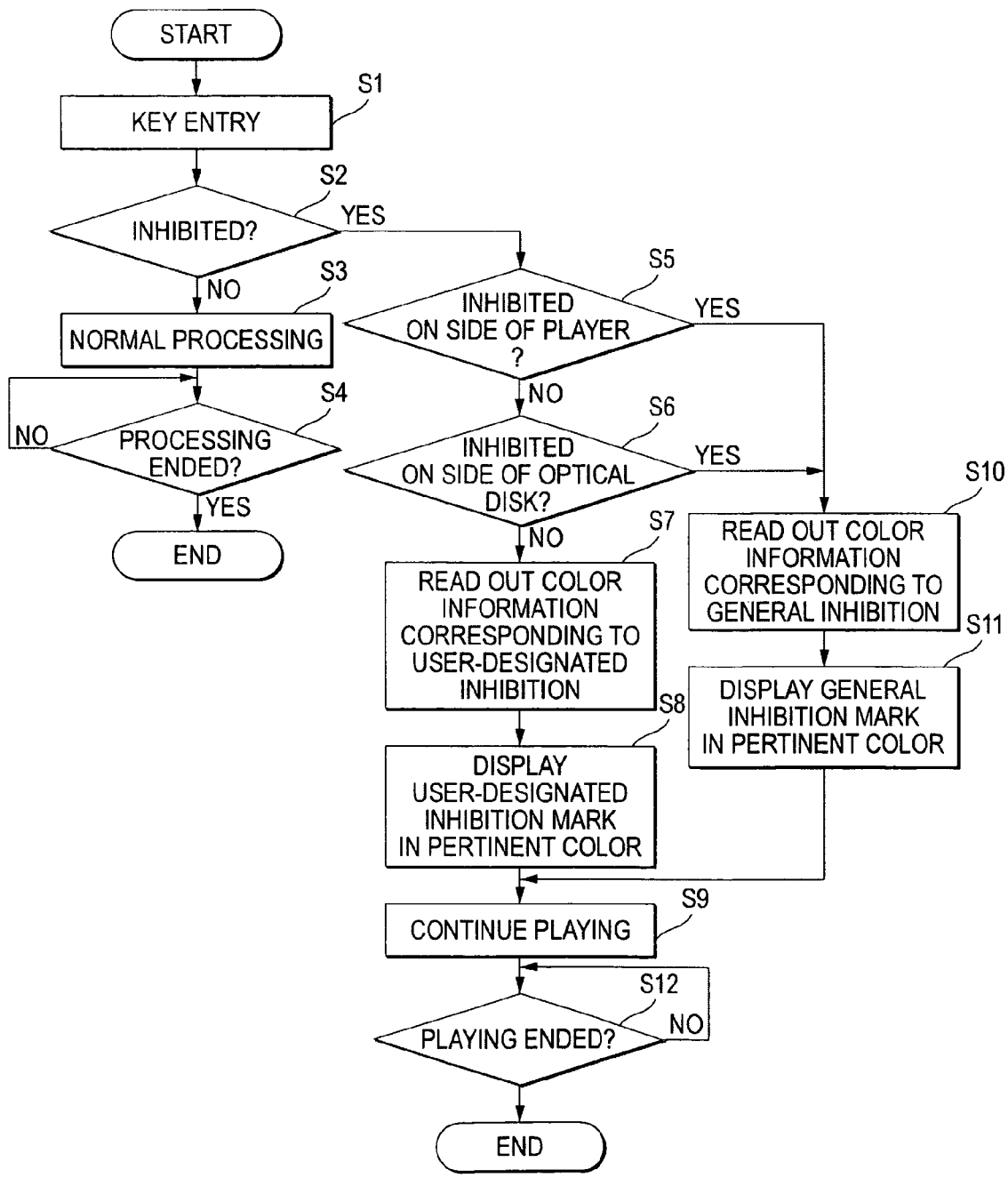
FIG. 4 is a flowchart for explaining the processing for the key entry inhibition during playing in this embodiment.

FIG. 4 is a flowchart for explaining the processing for the key entry inhibition during playing in this embodiment. Now referring to this flowchart and FIGS. 1 to 3, an explanation will be given of the processing for the key entry inhibition during playing.

During playing of the optical disk, when the user depresses the set-up key of the remote controller 21, the image 21a of the remote controller 21 is displayed on the display device 20 by the remote controller image displaying means 221. The inhibit key information indicating a key(s) by which key entry is inhibited during playing, this key being other than key(s) for which inhibition setting of a key operation is previously disabled on the side of the player or the optical disk, is stored in the inhibit key information storing means 222. During playing of the optical disk, the key(s) for which inhibition of the key entry is desired is selectively designated by the user. The user-designated inhibit key information indicating the designated key is stored in the user-designated inhibit key information storing means 223. The different items of color information for discriminating the inhibit key information, user-designated inhibit key information and inhibition-setting disabled key information from one another are stored in the color information storing means 224.

When the key entry is received (step S1), whether or not the key entry is inhibited by the inhibition determining means 225 is determined on the basis of the presence/absence of the inhibit key information from the inhibit key information storing means 222 and/or the user-designated inhibit key information from the user-designated inhibit key information storing means 223 (step S2). If it is determined by the absence of the inhibit key information and/or user-designated inhibit key information that the key entry is not inhibited (step S2), the key entry inhibition processing proceeds to normal processing corresponding to the operation contents of the depressed key (step S3). If the normal processing is ended (step S3), the key entry inhibition processing ends.

On the other hand, if it is determined by the presence of the inhibit key information and/or user-designated inhibit key information that the key entry is inhibited (step S2), on which side of the player or optical disk and the user the key entry is inhibited is determined by the inhibition side determining means 226 on the basis of the inhibit key information and user-designated inhibit key information (steps S5, S6).

Thereafter, the color mark displaying means 227 performs the following processing. If the determination result by the inhibition side determining means 226 is the player or optical disk side, the color mark display means 227 reads the color information corresponding to the inhibit key information from the color information storing means 224 (step S10) thereby to display a general inhibit mark with the color represented by the color information at the segment of the corresponding key of the remote controller image displayed on the display device (step S11).

If the determination result by the inhibition side determining means is the user side (steps S5, S6), the color mark display means 227 reads the color information corresponding to the user-designated inhibit key information from the color information storing means 224 (step S7) thereby to display a user-designated inhibit mark with the color represented by the color information on the display device 20 (step SB). Further, if the inhibit key(s) on the side of the player or optical disk is the same as that on the side of the user, the color mark display means 227 displays the general inhibit mark at the segment of the corresponding key of the remote controller image displayed on the display device 20 (step S11).

Additionally, the color mark display means 227 reads the color information corresponding to the inhibition setting disabled key information from the color information storing means 224 thereby to display an inhibition-setting disabled mark of the color information at the segment of the corresponding key of the remote controller image 21a displayed on the display device 20. Thus, because the key for which inhibition setting of the key entry is disabled is known, the labor of selecting the inhibit key(s) can be saved.

After the user-designated inhibit mark with the color (step S8) has been displayed, or the general inhibit mark with the color (step S11), the screen is changed to continue playing (step S9). When the playing has been ended, the key entry inhibition processing ends.

As understood from the description hitherto made, in accordance with this embodiment, the marks with the colors corresponding to the inhibit key information, user-designated inhibit key information and inhibition-setting disabled key information can be displayed at the segments of the corresponding keys of the remote controller image 21a displayed on the display device 20. In addition, the key(s) other than necessary and minimum keys during playing of an optical disk can be designated by the user so that the corresponding key entry is inhibited. Thus, inadvertent key entry during playing of the optical disk can be prevented. Accordingly, it is possible to prevent the reproduced image from being fed forward against the user's will or the image not relevant to the image now being reproduced from being displayed. Further, as described above, by displaying the keys in classified different colors, the key(s) for which inhibition of the key entry is desired by the user and the key(s) for which inhibition-setting of the key entry is disabled can be discriminated immediately, thus facilitating the setting operation of the inhibit key (s).

What is claimed is:

1. An optical disk player to reproduce information recorded on an optical disk, being operable by a remote controller comprising a system controller, which includes:
    a remote controller image displaying unit to display an image of the remote controller on the display device by set-up;
    an inhibit key information storing unit to store inhibit key information indicating a key by which key entry is inhibited during playing, the key being other than keys for which inhibition setting of a key operation is previously disabled on the side of the player or the optical disk;
    a user-designated inhibit key information storing unit to store user-designated inhibit key information indicating a user-designated key for which inhibition of the key entry is desired during playing of the optical disk;
    a color information storing unit to store different items of color information for discriminating the inhibit key information, the user-designated inhibit key information, and the inhibition-setting disabled key information from one another;
    an inhibition determining unit to determine whether or not the key entry is inhibited when it is received on a basis of presence/absence of the inhibit key information from the inhibit key information storing unit and/or the user-designated inhibit key information from the user-designated inhibit key information storing unit;
    an inhibition side determining unit to determine, if it is determined by the inhibition determining unit that the key entry is inhibited, on which side of the player or optical disk or of the user, the key entry is inhibited on a basis of the inhibit key information and user-designated inhibit key information; and
    a color mark displaying unit that reads, if a determination result by the inhibition side determining unit is the player or optical disk side, the color information corresponding to the inhibit key information from the color information storing unit thereby to display a general inhibit mark with a color represented by the color information at the segment of the corresponding key of the remote controller image displayed on the display device, that reads, if the determination result by the inhibition side determining unit is the user side, the color information corresponding to the user-designated inhibit key information from color information storing unit thereby to display a user-designated inhibit mark with color represented by the color information on the display device, and that displays, if the inhibit key on the side of the player or optical disk is the same as that on the side of the user, the general inhibit mark at the segment of the corresponding key of the remote controller image displayed on the display device and reads color information corresponding to the inhibition setting disabled key information from the color information storing unit thereby to display an inhibition setting disabled mark with color represented by the color information at the segment of the corresponding key of the remote controller image displayed on the display device.

2. An optical disk player to reproduce information recorded on an optical disk, being operable by a remote controller, comprising a system controller that displays an image of the remote controller on a display device by set-up, that stores different items of color information for discriminating, from one another, inhibit key information indicating a key by which key entry is inhibited during playing, the key being other than keys for which inhibition setting of a key operation is previously disabled on a side of the player or the optical disk, user-designated inhibit key information indicating a user-designated key for which inhibition of the key entry is desired during playing of the optical disk, and inhibition-setting disabled key information, and that displays color marks according to the different items of color information at segments of corresponding keys on the remote controller image displayed on the display device, wherein the system controller includes:
    a remote controller image displaying unit to display an image of the remote controller on the display device by set-up;
    an inhibit key information storing unit to store inhibit key information indicating a key by which key entry is inhibited during playing, the key being other than keys for which inhibition setting of a key operation is previously disabled on a side of the player or the optical disk;
    a user-designated inhibit key information storing unit to store user-designated inhibit key information indicating a user-designated key for which inhibition of the key entry is desired during playing of the optical disk; and
    a color information storing unit to store different items of color information for discriminating the inhibit key information, the user-designated inhibit key information, and the inhibition-setting disabled key information from one another.

3. The optical disk player according to claim 2, wherein the system controller includes:
    an inhibition determining unit to determine whether or not the key entry is inhibited when it is received on a basis of presence/absence of the inhibit key information from the inhibit key information storing unit and/or the user-designated inhibit key information from the user-designated inhibit key information storing unit;
    an inhibition side determining unit to determine, if it is determined by the inhibition determining unit that the key entry is inhibited, on which side of the player or optical disk or of the user, the key entry is inhibited on a basis of the inhibit key information and user-designated inhibit key information; and
    a color mark displaying unit that reads, if a determination result by the inhibition side determining unit is the player or optical disk side, color information corresponding to the inhibit key information from the color information storing unit thereby to display a general inhibit mark with color represented by the color information at the segment of the corresponding key of the remote controller image displayed on the display device, that reads, if the determination result by the inhibition side determining unit is the user side, color information corresponding to the user-designated inhibit key information from the color information storing unit thereby to display a user-designated inhibit mark with color represented by the color information on the display device, and that displays, if the inhibit key on the side of the player or optical disk is the same as that on the side of the user, the general inhibit mark at the segment of the corresponding key of the remote controller image displayed on the display device and reads color information corresponding to the inhibition setting disabled key information from the color information storing unit thereby to display an inhibition-setting disabled mark with color represented by the color information at the segment of the corresponding key of the remote controller image displayed on the display device.

4. An optical disk playing method for reproducing information recorded on an optical disk, comprising:

displaying an image of the remote controller on the display device by set-up;

storing inhibit key information indicating a key by which key entry is inhibited during playing, the key being other than keys for which inhibition setting of a key operation is previously disabled on the side of the player or the optical disk;

storing user-designated inhibit key information indicating a user-designated key for which inhibition of the key entry is desired during playing of the optical disk;

storing different items of color information for discriminating the inhibit key information, the user-designated inhibit key information, and the inhibition-setting disabled key information from one another;

determining whether or not the key entry is inhibited when it is received on a basis of presence/absence of the inhibit key information and/or the user-designated inhibit key information;

determining, if it is determined that the key entry is inhibited, on which side of the player or optical disk or of the user, the key entry is inhibited on a basis of the inhibit key information and user-designated inhibit key information;

reading, if a determination result is the player or optical disk side, the color information corresponding to the inhibit key information thereby to display a general inhibit mark with a color represented by the color information at the segment of the corresponding key of the remote controller image displayed on the display device;

reading, if the determination result is the user side, the color information corresponding to the user-designated inhibit key information thereby to display a user-designated inhibit mark with color represented by the color information on the display device; and displaying, if the inhibit key on the side of the player or optical disk is the same as that on the side of the user, the general inhibit mark at the segment of the corresponding key of the remote controller image displayed on the display device, to read color information corresponding to the inhibition setting disabled key information thereby to display an inhibition setting disabled mark with color represented by the color information at the segment of the corresponding key of the remote controller image displayed on the display device.

* * * * *